United States Patent
Chen et al.

(10) Patent No.: US 9,301,209 B2
(45) Date of Patent: Mar. 29, 2016

(54) METHOD AND APPARATUS FOR OBTAINING RELIABLE E-DCH RECEPTION FOR TRANSMISSION OF SCHEDULING INFORMATION

(71) Applicant: Broadcom Corporation, Irvine, CA (US)

(72) Inventors: Tao Chen, Espoo (FI); Arto Lehti, Oulu (FI); Christopher Peter Callender, Cleish (GB); Marko Lampinen, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 123 days.

(21) Appl. No.: 14/069,444

(22) Filed: Nov. 1, 2013

(65) Prior Publication Data

US 2014/0126537 A1   May 8, 2014

(30) Foreign Application Priority Data

Nov. 2, 2012  (GB) .................................. 1219717.4

(51) Int. Cl.
  *H04W 4/00*  (2009.01)
  *H04B 7/00*  (2006.01)
  *H04W 36/00*  (2009.01)
  *H04W 52/36*  (2009.01)
  (Continued)

(52) U.S. Cl.
  CPC ........ *H04W 36/0016* (2013.01); *H04W 52/367* (2013.01); *H04W 36/18* (2013.01); *H04W 52/146* (2013.01); *H04W 52/244* (2013.01); *H04W 52/286* (2013.01); *H04W 72/1278* (2013.01); *H04W 84/045* (2013.01)

(58) Field of Classification Search
  CPC .. H04W 72/0406; H04W 72/00; H04L 5/001; H04L 5/0053
  See application file for complete search history.

(56) References Cited

FOREIGN PATENT DOCUMENTS

| JP | EP1631104 A1 | 3/2006 |
|----|----|----|
| JP | EP1708524 A1 | 10/2006 |
| KR | 200778331 A | 7/2007 |

OTHER PUBLICATIONS

3GPP TS 25.321 V11.20 (Sep. 2012); 3rd Generation Partnership Project; Technical Specification Group Radio vol. 11.2.0; 3rd Generation Partnership Project;Technical Specification Group Radio Access Network; Medium Access Control (MAC) protocol specification (Release 11); 198 pages.

(Continued)

*Primary Examiner* — Melanie Jagannathan
(74) *Attorney, Agent, or Firm* — Oblon, McClelland, Maier & Neustadt, L.L.P.

(57) ABSTRACT

A system to obtain an enhanced-transport format combination (E-TFC) for transmitting a scheduling information (SI) in a soft handoff (SHO) to a serving enhanced Data Channel (E-DCH) cell in a heterogeneous Network (HetNet). The system comprises receiving an E-TFC selection power backoff (ESPB) value from an active macro-cell, the active macro-cell being the service E-DCH cell; determining the E-TFC based on an indicated power of a serving grant minus the received ESPB value and a set of E-TFC power offset value received from the active macro cell, if an MAC-e/i data PDU to be transmitted is multiplexed with the SI; otherwise, determining the E-TFC based on the indicated power of the serving grant and the set of E-TFC power offset value; and transmitting the MAC-e/i PDU to the active macro cell using the indicated power of the serving grant and an enhanced dedicated channel selected based on the determined E-TFC.

20 Claims, 6 Drawing Sheets

(51) Int. Cl.
*H04W 72/12* (2009.01)
*H04W 36/18* (2009.01)
*H04W 84/04* (2009.01)
*H04W 52/14* (2009.01)
*H04W 52/24* (2009.01)
*H04W 52/28* (2009.01)

(56) References Cited

OTHER PUBLICATIONS

3GPP TS 25.331 V11.20 (Sep. 2012); 3rd Generation Partnership Project; Technical Specification Group Radio Access Network; Radio Resource Control (RRC); Protocol Specification (Release 11) Copyrighted 2012, 3GPP Organizational Partners (ARIB, ATIS, CCSA, ETSI, TTA, TTC); (pp. 1-35); (p. 1).

METHOD AND APPARATUS FOR OBTAINING RELIABLE E-DCH RECEPTION FOR TRANSMISSION OF SCHEDULING INFORMATION

CROSS REFERENCE TO RELATED APPLICATION

This application claims the benefit under 35 U.S.C. §119 (a) and 37 CFR §1.55 to UK patent application no. GB1219717.4, filed on Nov. 2, 2012, the entire content of which is incorporated herein by reference.

TECHNICAL FIELD

An example embodiment of the present invention relates generally to wireless communications, and, more particularly, to obtaining reliable enhanced data channel (E_DCH) reception for transmission of scheduling information (SI) in a heterogeneous network (HetNet) scenario.

BACKGROUND

Recently heterogeneous network deployments, where low power nodes of a pico cell are placed throughout a macro-cell, have gained significant interest from cellular network operators as a means to enhance system performance in terms of both coverage and capacity. A co-channel heterogeneous network deployment in which small power nodes use a same carrier frequency as an active macro cell is being studied at 3GPP. Under co-channel deployment, introduction of low power nodes into an active macro cell presents some challenges regarding reliability of control channels, in particular High Speed-Dedicated Physical Control Channel (HS-DPCCH) as well as the interference management between low power nodes (LPN) and high power nodes (HPN). Some issue may also arise regarding power measurements. Typically mobility in Wideband Code Division Multiple Access (WCDMA) is handled based at least in part on received power measurements of common pilot channel (CPICH). In a homogeneous network deployment where the transmission power of a base station such as a nodeB is same as a receiver's CPICH power measurement, both the transmission power and receiver power are proportional to pathloss of CPICH and thus reliable transmission of SI is not a serious concern. However, this may not be the case in a HetNet deployment.

For a soft handover (SHO) in a HetNet scenario, there may be an imbalanced uplink (UL)/downlink (DL) for the serving E-DCH cell. As a result of the link imbalance, the UL SI including UPH and data buffer status may not be received correctly by the serving E-DCH cell. More specifically, this may be related to the fact that power control (PC) for DPCCH is based on the best uplink of the radio link set (RLS) whereas the SI is only targeting the serving E-DCH cell which may have an uplink with lower link quality. Thus an SI message may fail to reach the serving E-DCH cell, at least in part due to the uplink imbalance in a SHO region. A solution is needed for a reliable SI transmission for multiplexed MAC-e/i PDU at least in a SHO region.

In general, SI reporting is either performed periodically based on a period defined by radio resource control (RRC) protocol as defined in 3GPP TS25.331 and/or triggered by an event of MAC layer as defined in 3GPP TS25.321. The triggers of SI reporting are also summarized in TS25.319 depending on whether the SI is sent along with the data. In short, UL SI may be transmitted to the serving E-DCH RLS as either a stand-alone MAC-e/i PDU or a part of a MAC-e/i PDU multiplexed with a MAC-d flow PDUs.

A User Equipment (UE) is allocated a Serving Grant (SG) which determines the rate at which scheduled data is transmitted. The SG is expressed in the terms of the power available for transmission. In a spread spectrum system, such as Wideband Code Division Multiple Access (WCDMA) and Universal Mobile Telecommunications System Frequency Division Duplexing (UMTS-FDD) used in HSUPA, the transmission power generally increases with the bit rate. Thus, a higher SG translates to a higher bit rate at which the UE can transmit data and so more scheduled data can be transmitted in a given time interval. The SG is used, along with other relevant parameters, to select an Enhanced Dedicated Transport Channel Transport Format Combination (E-TFC). The E-TFC is selected from a group of possible E-TFCs (defined in 3GPP TS 25.321 Version 11.2.0 Appendix B), with each E-TFC supporting a different transport block size. During the selection of an E-TFC to be transmitted, the SG is converted into a number of bits and used together with other relevant parameters to select the amount of useful data, expressed as a number of bits, which can be transmitted. Useful data is data which has a purpose and use in the communication system, and in HSUPA is the transmitted MAC-e or MACi PDU. The selected E-TFC is the one with the smallest transport block size which will allow the transmission of the useful data.

The following abbreviations are used in this application.
AG Absolute Grant
BS Base Station
CPICH Common Pilot Channel
CRC Cyclic redundancy check
DPCCH Dedicated Physical Control Channel
E-AGCH Enhanced Absolute Grant Channel
E-DCH Enhanced Data Channel
E-RGCH Enhanced Relative Grant Channel
E-TFC E-DCH Transport Format Combination
EUTRAN Enhanced UTRAN
HetNet Heterogeneous Network
HPN High Power Node
HPN BS High Power Node BS
HS-DPCCH High Speed-Dedicated Physical Control Channel
HSPA High Speed Packet Access
HUE HPN UE (UE served by HPN)
LPN Low Power Node BS
LTE Long Term Evolution
LUE LPN UE (UE served by LPN)
MAC Medium Access Control
MCS Modulation & Coding Scheme
OLPC Outer Loop Power Control
PC Power Control
RG Relative Grant
RLS Radio Link Set
RNC Radio Network Controller
SG Serving Grant
SHO Soft Handover
SI Scheduling Information
SIR Signal-to-Interference Ratio
SINR Signal to Interference Noise Ratio
TFC Transport Format Combination
TFCI Transport Format Combination Indicator
UE User Equipment
UMTS Universal Mobile Telecommunications System
UPH UE Power Headroom
UTRAN UMTS Radio Access Network

SUMMARY

Various aspects of the invention are set out in the claims.

In a first exemplary embodiment of the invention, there is a method for a UE to obtain an enhanced-transport format combination (E-TFC) for transmitting a scheduling information (SI) in a soft handoff (SHO) to a serving enhanced Data Channel (E-DCH) cell in a heterogeneous Network (HetNet), comprises receiving an E-TFC selection power backoff (ESPB) value from an active macro cell, the active macro cell being the service E-DCH cell; determining the E-TFC based on an indicated power of a serving grant minus the received ESPB value and a set of E-TFC power offset value received from the active macro cell, if an MAC-e/i data PDU to be transmitted is multiplexed with the SI; otherwise, determining the E-TFC based on the indicated power of the serving grant and the set of E-TFC power offset value; and transmitting the MAC-e/i PDU to the active macro cell using the indicated power of the serving grant and an enhanced dedicated channel selected based on the determined E-TFC.

In a second exemplary embodiment of the invention, there is an apparatus for use in a user equipment (UE) to obtain an enhanced-transport format combination (E-TFC) for transmitting a scheduling information (SI) in a soft handoff (SHO) to a serving enhanced Data Channel (E-DCH) cell in a heterogeneous Network (HetNet), comprises a processing system. The processing system is configured to receive an E-TFC selection power backoff (ESPB) value from an active macro cell, the active macro cell being the service E-DCH cell; determine the E-TFC based on an indicated power of a serving grant minus the received ESPB value and a set of E-TFC power offset value received from the active macro cell, if an MAC-e/i data PDU to be transmitted is multiplexed with the SI; otherwise, determine the E-TFC based on the indicated power of the serving grant and the set of E-TFC power offset value; and transmit the MAC-e/i data PDU to the active macro cell using the indicated power of the serving grant and an enhanced dedicated channel selected based on the determined E-TFC.

In a third exemplary embodiment of the invention, there is a non-transitory computer-readable storage medium comprising a set of instructions, which, when executed by a user equipment (UE) to obtain an enhanced-transport format combination (E-TFC) for transmitting a scheduling information (SI) in a soft handoff (SHO) to a serving enhanced Data Channel (E-DCH) cell in a heterogeneous Network (HetNet), causes the UE to perform the steps of: receiving an E-TFC selection power backoff (ESPB) value from an active macro cell, the active macro cell being the service E-DCH cell; determining the E-TFC based on an indicated power of a serving grant minus the received ESPB value and a set of E-TFC power offset value received from the active macro cell, if an MAC-e/i data PDU to be transmitted is multiplexed with the SI; otherwise, determining the E-TFC based on the indicated power of the serving grant and the set of E-TFC power offset value; and transmitting the MAC-e/i PDU to the active macro cell using the indicated power of the serving grant and an enhanced dedicated channel selected based on the determined E-TFC.

In a fourth exemplary embodiment of the invention, there is a method for an active macro cell to obtain an enhanced-transport format combination indication (E-TFCI) for receiving a scheduling information (SI) in a soft handoff (SHO) in a heterogeneous Network (HetNet) comprises determining an ESPB value based on errors of SI multiplexed E-DCH data frames received from an UE; signaling the ESPB to the UE; setting an SI indication bit in each of received MAC-e/i data frames and forwarding the data frame to an associated RNC; causing an outer loop power control (OLPC) adjustment at the associated RNC; and optimizing SI and data transmissions.

In a fifth exemplary embodiment of the invention, there is an apparatus for use in an active macro cell to obtain an enhanced-transport format combination indication (E-TFCI) for receiving a scheduling information (SI) in a soft handoff (SHO) in a heterogeneous Network (HetNet), comprises a processing system. The processing system is configured to determine an ESPB value based on errors of SI multiplexed E-DCH data frames received from an UE; signal the ESPB to the UE; set an SI indication bit in each of received MAC-e/i data frames and forwarding the data frame to an associated RNC; cause an outer loop power control (OLPC) adjustment at the associated RNC; and optimize SI and data transmissions.

In a sixth exemplary embodiment of the invention, there is an apparatus for use in a user equipment (UE) to obtain an enhanced-transport format combination (E-TFC) for transmitting a scheduling information (SI) in a soft handoff (SHO) to a serving enhanced Data Channel (E-DCH) cell in a heterogeneous Network (HetNet), comprises means configured to receive an E-TFC selection power backoff (ESPB) value from an active macro cell, the active macro cell being the service E-DCH cell; means configured to determine the E-TFC based on an indicated power of a serving grant minus the received ESPB value and a set of E-TFC power offset value received from the active macro cell, if an MAC-e/i data PDU to be transmitted is multiplexed with the SI; means configured to, otherwise, determine the E-TFC based on the indicated power of the serving grant and the set of E-TFC power offset value; and means configured to transmit the MAC-e/i data PDU to the active macro cell using the indicated power of the serving grant and an enhanced dedicated channel selected based on the determined E-TFC.

In a seventh exemplary embodiment of the invention, there is a non-transitory computer-readable storage medium comprising a set of instructions, which, when executed by an active macro cell to obtain an enhanced-transport format combination indication (E-TFCI) for receiving a scheduling information (SI) in a soft handoff (SHO) in a heterogeneous Network (HetNet), causes the active macro cell to perform the steps of determining an ESPB value based on errors of SI multiplexed E-DCH data frames received from an UE; signaling the ESPB to the UE; setting an SI indication bit in each of received MAC-e/i data frames and forwarding the data frame to an associated RNC; causing an outer loop power control (OLPC) adjustment at the associated RNC; and optimizing SI and data transmissions.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
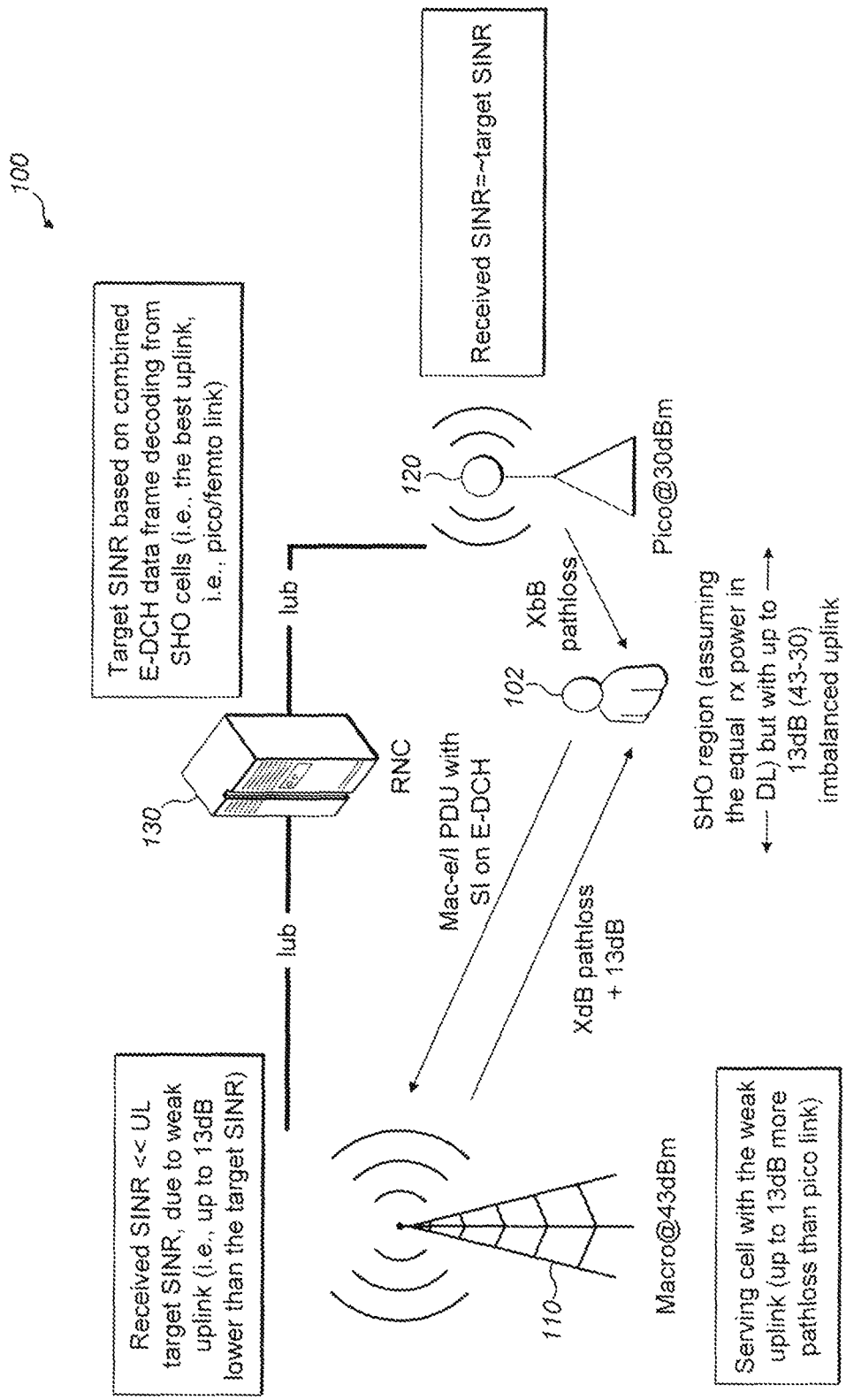
FIG. 1 illustrates an example wireless system in accordance with an example embodiment of the invention.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. As used herein, the terms "data," "content," "information," and similar terms may be used interchangeably to refer to data capable of being transmitted, received and/or stored in accordance with embodiments of the present invention. Likewise, as used herein, the terms "active macro cell," "active base station," and "active nodeB" may be used interchangeably to refer to a base station of a cellular network to which an UE is currently connected to via a wireless connection. Similarly, the terms "data PDU" and "data frame" may be used interchangeably to refer to a data unit carried on a wireless link. Thus, use of any such terms should not be taken to limit the spirit and scope of embodiments of the present invention.

Additionally, as used herein, the terms 'circuitry' and 'module' refer to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

In one aspect of the invention, there is a method for a user equipment (UE) to obtain an enhanced-transport format combination (E-TFC) for transmitting a scheduling information (SI) in a soft handoff (SHO) to a serving enhanced Data Channel (E-DCH) cell in a heterogeneous Network (HetNet), the method comprising receiving an E-TFC selection power backoff (ESPB) value from an active macro cell, the active macro cell being the service E-DCH cell; determining the E-TFC based on an indicated power of a serving grant minus the received ESPB value and a set of E-TFC power offset values received from the active macro cell, if an MAC-e/i data PDU to be transmitted is multiplexed with the SI; otherwise, determining the E-TFC based on the indicated power of the serving grant and the set of E-TFC power offset values; and transmitting the MAC-e/i PDU to the active macro cell using the indicated power of the serving grant and an enhanced dedicated channel selected based on the determined E-TFC.

Determining the E-TFC may further comprise adjusting an enhanced Data Channel (E-DCH) power for each E-DCH autonomously according to a number of received acknowledgements and non-acknowledgements (ACK/NACK) in response to an SI multiplexed data transmission sent to the active macro cell; and causing the ESPB to be updated less frequently by the active macro cell and an associated radio network controller (RNC) as a result of adjusting the E-DCH power.

Determining the E-TFC alternatively may comprise receiving a second set of E_TFC power offset values from the active macro cell, each of the E-TFC power offset values setting a higher power for each E_TFC; and selecting the E-TFC with an E-TFC power offset value corresponding to a transmission power being closest to the indicated power of the serving grant.

Receiving the ESPB value further comprises one of: receiving the ESPB value in the MAC-e/i PDU from the active macro cell in a RRC message; and receiving the ESPB value over an HS-SCCH channel from the active macro cell, according to an SI decoding performance wherein the active macro cell is responsible for updating the ESPB value based on a quality of SI multiplexed E-DCH data received at the active macro cell.

The method may further comprise optimizing the SI and data transmission using a time division multiplexed transmission for the data and SI.

Optimizing the SI and data transmission may comprise: refraining from multiplexing the SI with data upon receiving an indication from the active macro cell that the active macro cell is no longer capable of decoding packets correctly with a lowest E-TFCI or there is not a sufficient headroom for adjusting the serving grant for simultaneous transmissions.

Optimizing the SI and data transmission may comprise one of: transmitting the SI and data separately to the active macro cell using a time division multiple transmission as indicated in a control signaling message sent from the active macro cell or an associated RNC; and transmitting the SI and data separately to the active macro cell using the time division multiple transmission as determined by the UE itself when there is not a sufficient power to support a lowest E-TFCI after the ESPB value is applied in determining the E_TFC.

The method may further comprise causing an update to an outer loop power control by: causing an associated RNC not to update an SIR Target if the SI is multiplexed in a MAC-e/i data subframe; or causing the associated RNC to update the SIR Target based on an error of the MAC-e/i data subframe in an outer loop power control action, if the SI is not multiplexed in the MAC-e/i data subframe.

The UE may be one of a LTE UE, a UMTS UE, and a UE with High Speed Packet Access (HSPA) capabilities.

In another aspect of the invention there is a method for an active macro cell to obtain an enhanced-transport format combination indication (E-TFCI) for receiving a scheduling information (SI) in a soft handoff (SHO) in a heterogeneous Network (HetNet), the method comprising: determining an ESPB value based on errors of SI multiplexed E-DCH data frames received from an UE; signaling the ESPB to the UE; setting an SI indication bit in each of received MAC-e/i data frames and forwarding the data frame to an associated RNC; causing an outer loop power control (OLPC) adjustment at the associated RNC; and optimizing SI and data transmissions.

Determining the ESPB value based on the errors of the SI multiplexed E-DCH data frames may comprise at least one of: increasing or decreasing the ESPB value based on a number of the errors in the received multiplexed E-DCH data frames; and setting an initial ESPB value based on historical data or link imbalance status.

Signaling the ESPB value to the UE may comprise encoding the ESPB value in a RRC message; determining an E-DCH maximum power grant as an absolute grant or a relative grant based on one or more of traffic conditions and available resources; and transmitting the RRC message to the UE.

The method may further comprise receiving the MAC-e/i data frames from the UE by receiving each of the MAC-e/i data frames with an indication indicating whether the SI is multiplexed in the MAC-e/i data frame.

Setting the SI indication bit in each of the received MAC-e/i data frames and forwarding the data frame to the associated RNC may comprise using one of spare bits in a data frame structure as an SI-Indication bit and adding the SI_Ind bit into a "UL DATA FRAME FOR E-DCH TYPE 1" data subframe for transmission of MAC-ES PDU data frames and into a "UL DATA FRAME FOR E-DCH TYPE 2" data frame for transmissions of MAC-IS PDU data subframes, to indicate whether each of the data subframes is multiplexed with the SI.

Causing an outer loop power control (OLPC) adjustment at the associated RNC may further comprise: causing the associated RNC not to update a signal-interference ratio (SIR) target in the OLPC adjustment if the SI indication bit indicates the SI is multiplexed in the MAC-e/i data subframe; or causing the associated RNC to update the SIR target based on errors of the SI multiplexed E-DCH data frames if the SI indication bit indicates that the SI is not multiplexed in the MAC-e/i data subframe.

Optimizing the SI and data transmission may further comprise at least one of sending a control signaling to the UE to prevent an SI multiplexed data transmission, upon discovering that the active macro cell itself cannot decode packets correctly with a lowest E-TFCI or there is not a sufficient headroom to adjust an E-DCH maximum power grant for the SI multiplexed data transmission; and allocating a suitable E-DCH maximum power grant to the UE, based on the ESPB value for the SI multiplexed data transmission, upon predicting that the UE is capable of transmitting the SI multiplexed E-DCH data frames on an E-DCH channel.

Referring now to FIG. 1, an example wireless network 100 is provided in accordance with an example embodiment of the invention. The wireless system 100 includes a UE 102, a macro cell 110, a pico cell 120 and a radio network controller (RNC) 130. The UE 102 is connected to the macro cell 110 via a wireless connection and can receive signals from the pico cell 120 as well. The macro cell 110 is an active cell and the UE 102 may send to the macro cell 110 MAC i/e data PDU with scheduling information (SI) included on an E-DCH. The RNC 130 is connected with both the macro cell 110 and the pico cell 120 via the standard interface Iub of 3GPP.

In one example embodiment, the UE 102 is involved in a voice or data call while in the area covered by both the macro cell 110 and the pico cell 120. This area is also called a SHO region. The RNC 130 may initiate a SHO for the UE to switchover from the macro cell 110 to the pico cell 120. In a homogenous network scenario, the UE 102 would have received a DL power that is similar from two connected cells due to the fact that SHO is based on the received downlink power. Based on the standard operation procedure, in which the target Signal to Interference Noise Ratio (SINR) for power control is determined by the RNC 130 based on the decoding of E-DCH data frames that are selected from combined SHO cells. A DPCCH power control is essentially based on the best uplink (i.e., the pico cell 120) rather than the serving cell (i.e., the macro cell 110). However, in this HetHet scenario as illustrated in FIG. 1, the macro cell 110 uses a 43 dBm transmitting power while the pico cell 120 uses a 30 dBm transmitting power. The transmission power difference means 13 dB pathloss difference between two SHO cells (i.e., 13 dB more pathloss for macro cell 110 than the pico cell 120) and also means a weaker uplink for the macro cell 110. Further, the macro cell 110 as the serving E-DCH cell needs to receive the SI information correctly for scheduling.

Due to the weaker link, the received SINR for E-DCH frame at the macro cell 110 may be up to 13 dB lower than the target SINR that is based on an uplink to the pico cell 120. This may result in a failure to either receive the SI or receive the SI correctly by the macro cell 110. Instead of following the normal standard operations, the active macro cell 110 determines an E-TFC selection power backoff (ESPB) value based on the errors of the SI multiplexed E-DCH data frames and then signals the ESPB value to the UE 102. The UE 102 then decides an enhanced-transport format combination (E-TFC) using the additional information from the received ESPB value. More specifically, if an MAC-e/i data PDU to be transmitted is multiplexed with the SI, the E-TFC is selected based on an indicated power of a serving grant minus the received ESPB value. Otherwise, E-TFC is selected according to the indicated power of the serving grant. The UE 102 transmits data to the active macro cell 110 still using a transmission power indicated in the serving grant. This has an effect of selecting a reliable E-TFCI while keeping the high transmission power as indicated by the serving grant. The macro cell 110 may detect whether a received data frame is multiplexed with the SI and if yes, may set an SI_indication bit in a data frame header before forwarding the data frame to the RNC 130. RNC 130 may then decide not to update a signal-interference ratio (SIR) target in an outer loop power control (OLPC) adjustment if the SI indication bit indicates the SI is multiplexed in the received data frame. RNC 130 may also decide to update the SIR target based on error of each corresponding MAC-e/i subframe if the SI is not multiplexed in the received data frame.

Figure 2:
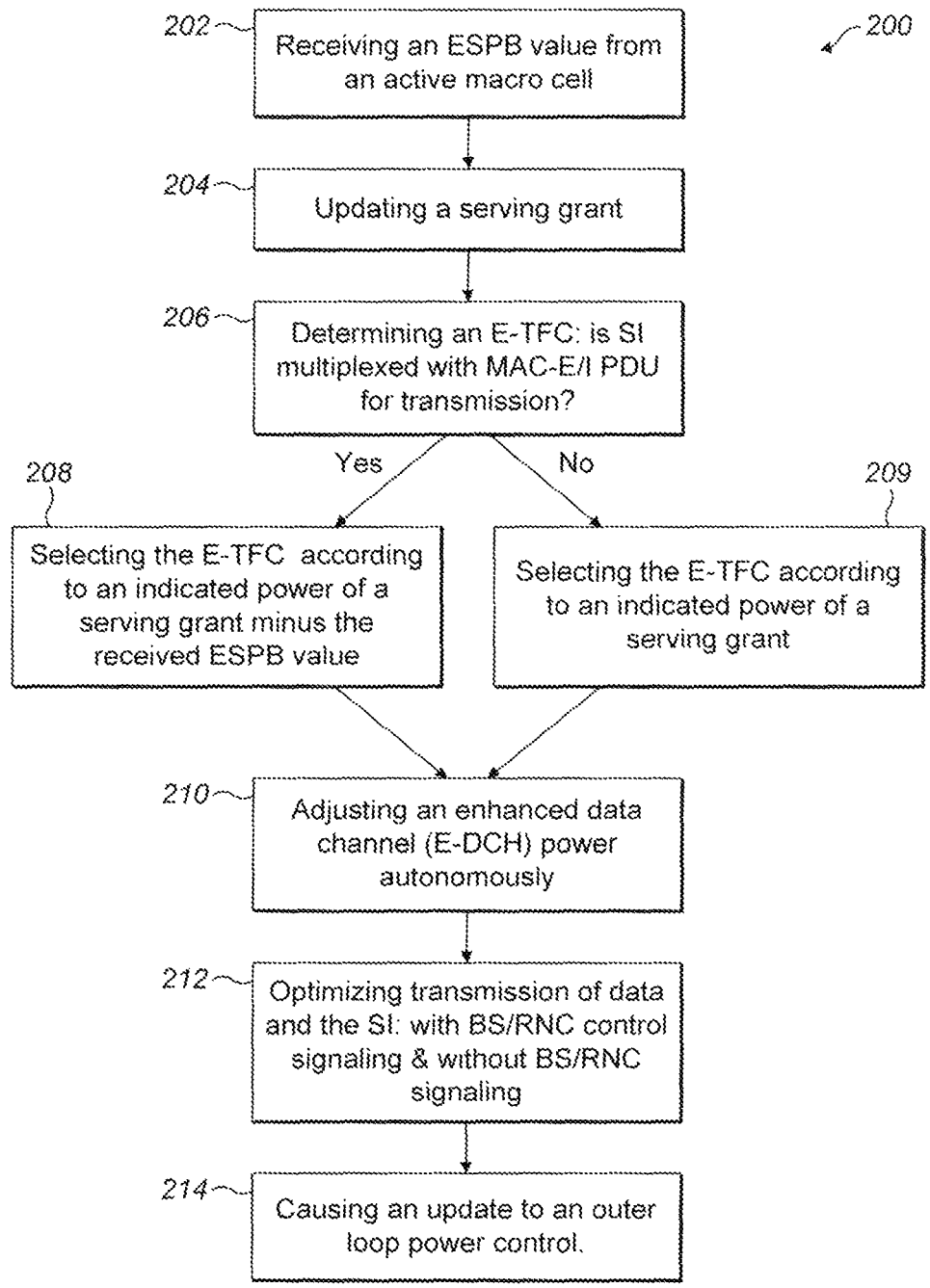
FIG. 2 illustrates an example method for obtaining an E-TFC for reliable SI transmission in accordance with an example embodiment of the invention.

FIG. 2 illustrates an example method for obtaining an E-TFC for reliable SI transmission in accordance with an example embodiment of the invention. The method 200 may include receiving an ESPB value at step 202, updating a serving grant at step 204, and determining an E-TFC depending on whether SI is multiplexed with MAC-e/i PDU for transmission at step 206. The method 200 may further include selecting the E-TFC at step 208 if the SI is multiplexed with a MAC-e/i PDU and otherwise selecting the E-TFC according to an indicated transmission power of the serving grant at step 209. The method 200 may further include adjusting E-DCH power at step 210, optimizing transmission of data with the multiplexed SI at step 212 and causing an update to an outer loop power control at step 214.

In one example embodiment, receiving an ESPB value at step 202 may include receiving the ESPB value from an active macro cell 110 in a signaling message such as a RRC message. In one example embodiment, receiving the ESPB value at step 202 may include receiving the ESPB value over an HS-SCCH channel from the active macro cell 110, according to an SI decoding performance. For example, the active macro cell 110 may send to the UE 102 the ESPB value based on the quality of the SI received with the E-DCH data. Receiving an ESPB value at step 202 may also include receiving an absolute ESPB value or a relative ESPB value.

In one example embodiment, updating a serving grant at step 204 may include updating the serving grant based on an absolute grant or a relative grant received from the active macro cell and a UE status. An absolute grant (AG) is a maximum power grant received from the active macro cell and a relative grant (RG) is a value relative to the power grant in the current serving grant. The active macro cell 110 may send either an AG or a RG based on a number of factors such as data traffic condition on the E-DCH, the amount of changes from the previous serving grant and the UE's current state.

In one example embodiment, determining an E-TFC at step 206 may include first checking whether the SI is multiplexed with MAC-e/i PDU for data transmission and selecting an E-TFC accordingly. If the SI is multiplexed with a MAC-e/i PDU, the method 200 includes selecting the E-TFC based on an indicated power of the serving grant minus the ESPB value and a set of E-TFC power offset value received from the active macro cell at step 208. Otherwise, the method 200 proceeds to step 209 and determining the E-TFC may include selecting the E-TFC based on the indicated power of the serving grant and the set of E-TFC power offset value. Thereafter, the method comprises transmitting the MAC-e/i PDU to the active macro cell using the indicated power of the serving grant and an enhanced dedicated channel selected based on the determined E-TFC.

In one example embodiment, determining an E-TFC at step 206 may alternatively include receiving another set of E_TFC power offset values from the active macro cell 110, the new E-TFC power offset values setting a higher power for each E_TFC and selecting an E-TFC with an E-TFC offset value corresponding to a transmission power being closest to a transmission power indicated in the serving grant. In principle, this alternative approach allows the active macro cell 110 to signal another set of E-TFC power offset values so that the UE can derive the power offset for all E-TFCs which each may have a higher power offset value than the original E-TFC offset value. Then during E-TFC selection, the UE may select a E-TFC with a transmission power closest to the indicated power of the serving grant.

In one example embodiment, adjusting an E-DCH power at step 210 may include adjusting an enhanced Data Channel (E-DCH) power autonomously according to a number of received acknowledgements and non-acknowledgements (ACK/NACK) in response to the SI multiplexed transmissions received by the active macro cell 110 which is also the serving E-DCH cell. Adjusting the E-DCH power at step 210 may also include causing the ESPB value to be updated less frequently by the active macro cell 110 and the RNC 130 as a result of adjusting the E-DCH power.

In one example embodiment, optimizing transmission of data and the SI at step 212 may include refraining from multiplexing the SI with data frames upon receiving a signaling message from the active macro cell 110 indicating that the macro cell 110 is unable to decode packets correctly with a lowest E-TFCI or there is not sufficient headroom for adjusting serving grant for simultaneous transmissions. In this case, the UE 102 may transmit the data frames and the SI separately to the active macro cell 110 using a time division multiple transmission as indicated in the signaling message. Alternatively, the UE 102 may transmit either the SI or data autonomously without any signaling from the macro cell 110 or RNC 130, if the UE 201 determines that the remaining allowed power with the ESPB value applied for E-TFC selection is not sufficient to support the lowest E-TFCI.

In one example embodiment, causing an update to an outer loop power control at step 214 may include causing the associated RNC 130 not to update an SIR Target if the SI is multiplexed in a MAC-e/i data subframe, because the UE 102 already used the ESPB value to offset the effect of link imbalance between uplinks and downlinks in a HetNet scenario as illustrated in FIG. 1. If the SI is not multiplexed in the MAC-e/i data subframe, causing the update to an outer loop power control at step 214 may include causing the associated RNC 130 to update the SIR Target based on errors in the received subframes.

Figure 6:
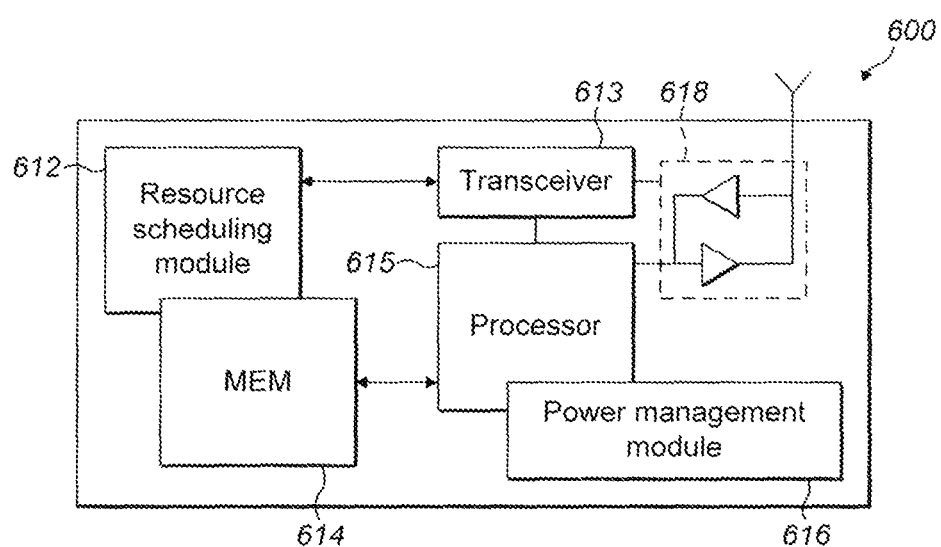
FIG. 6 illustrates an example wireless apparatus in accordance with an example embodiment of the invention.

In one example embodiment, the method 200 may be implemented at the UE 102 of FIG. 1 or at the apparatus 600 of FIG. 6. The method 200 is for illustration only and the steps of the method 200 may be combined, divided, or executed in a different order than illustrated, without departing from the scope of the invention of this example embodiment.

Figure 3:
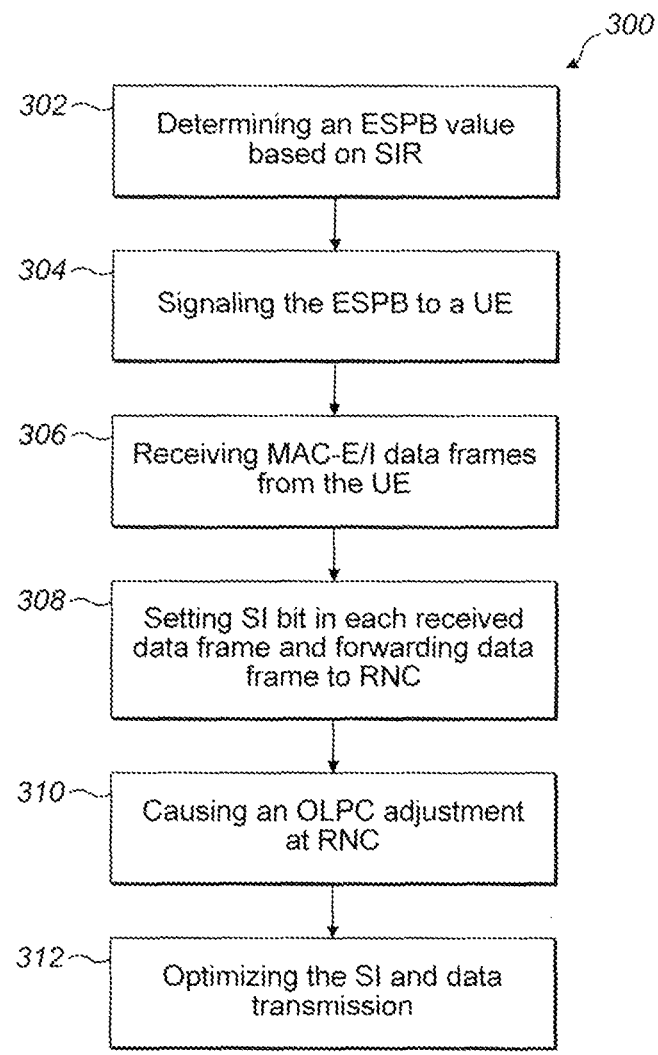
FIG. 3 illustrates an example method for outer loop power control update in accordance with an example embodiment of the invention.

FIG. 3 illustrates an example method 300 for outer loop power update in accordance with an example embodiment of the invention. The method 300 may include determining an ESPB value at step 302, signaling the ESPB value to a UE at step 304, and receiving MAC-e/i data frames from the UE with the SI multiplexed. The method 300 may also include setting an SI indication bit in each received data frame and forwarding the data frame to a RNC at step 308, causing an outer loop power control (OLPC) adjustment by the RNC at step 310 and optimizing the SI and data transmissions at step 312.

In one example embodiment, determining the ESPB value at step 302 may include determining the ESPB value based on SI multiplexed E-DCH data frame errors. For example, if the number of data frame error is high or trending up, the active macro cell 110 may increase the ESPB value to cause a lower E-TFC to be selected at the UE 102. On the other hand, if the number of data frame errors is low or trending down, the active macro cell 110 may maintain the current ESPB value or decrease it proportionally to cause the same or a higher E-TFC to be selected. In one example embodiment, a threshold value for data frame errors from either standards or empirical studies may be used to help determine whether the ESPB value shall be increase, decreased or kept same.

In one example embodiment, signaling the ESPB value to UE at step 304 may include using a standard protocol such as RRC to send the ESPB value to the UE 102. In one example embodiment, a RRC message which is typically originated from the RNC 130 may be sent by the active macro cell 110 to the UE and the information elements (IEs) such as "E-DCH info" or "E-DCH reconfiguration info" in the RRC message may be used to carry the ESPB value. In an alternative embodiment, the active macro cell 110 may use a physical layer signaling over HS-SCCH channel to convey the ESPB value to the UE 102.

In one example embodiment, receiving SI multiplexed MAC-e/i data frames from the UE at step 306 may include demultiplexing each of the received data frames, decoding at least the frame header, and detecting whether the SI is multiplexed in the data frame by checking an MAC-e/i PDU header. If the active macro cell 110 determines that the SI is included in the received data frame, the active macro cell 110 may proceed to step 308 to set an SI indicator (e.g., SI_ind='1') in the data frame to be forwarded to the RNC 130. Otherwise, the active macro cell 110 may simply forward the data frame with SI_ind='0' or no SI_ind to the RNC 130.

In one example embodiment, setting an SI_indication bit in each received data frame and forwarding the data frame to a RNC at step 308 may include setting a specific SI indication bit in the header of each received data frame. In one example embodiment, the active macro cell 110 sets a spare bit in header CRC to indicate that the SI is multiplexed in the data frame and forwards the data frame to the RNC 130. More specifically, the active macro cell 110 may use one bit for the SI-Ind field to replace one spare bit in a current data frame structure and add the SI_Ind bit into "UL DATA FRAME FOR E-DCH TYPE 1" data frame for transmitting a MAC-es PDU and into "UL DATA FRAME FOR E-DCH TYPE 2" data frame for transmitting a MAC-is PDU, to indicate whether the data is transmitted with a multiplexed SI in a corresponding MAC-e/MAC-i subframe.

In one example embodiment, causing an outer loop power control (OLPC) adjustment by the RNC at step 310 may include causing the RNC not to update SIR_Target in the OLPC adjustment if SI indication bit indicates that the SI is multiplexed in the data subframe, because, as explained earlier, the UE already used the ESPB value to offset the effect of link imbalance between uplinks and downlinks in a HetNet scenario as illustrated in FIG. 1. Otherwise, causing an outer loop power control (OLPC) adjustment by the RNC at step 310 may include causing the RNC to update SIR_Target based on errors of the corresponding MAC-e/i subframe.

In one example embodiment, optimizing the SI and data transmission at step 312 may include sending a control signaling to the UE to prevent the UE from multiplexing the SI in data transmission, upon discovering that the active macro cell 110 itself cannot decode the packets correctly with a lowest E-TFCI or there is not sufficient headroom to adjust AG/RG for simultaneous transmission. Otherwise, optimizing the SI and data transmission at step 312 may include allocating a suitable AG/RG to the UE, upon predicting that the UE is capable of transmitting SI multiplexed data frames on an E-DCH channel.

In one example embodiment, the method 300 may be implemented at the macro cell 110 of FIG. 1. The method 300 is for illustration only and the steps of the method 300 may be combined, divided, or executed in a different order than illustrated, without departing from the scope of the invention of this example embodiment.

Figure 4:
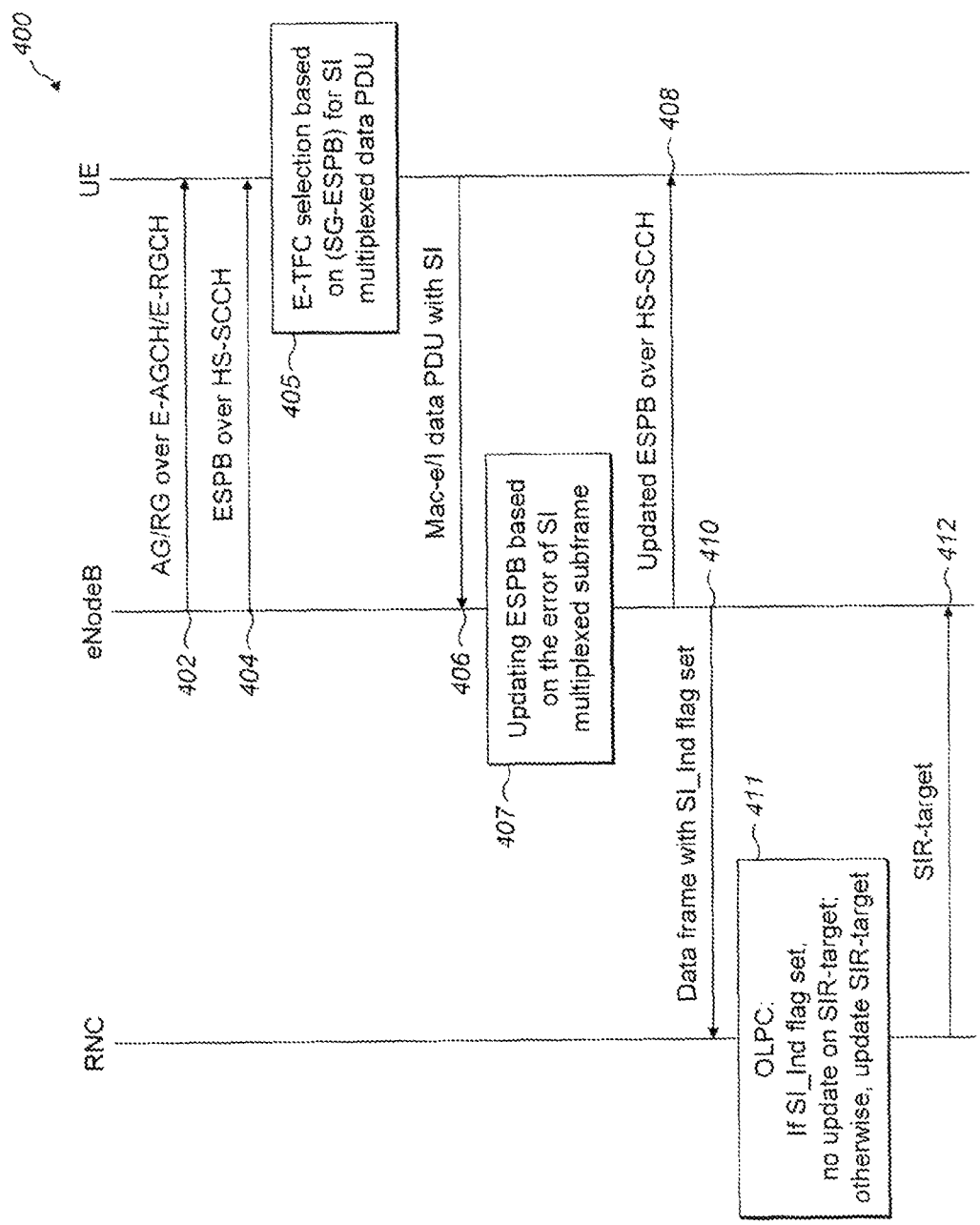
FIG. 4 illustrates an example message flow diagram for obtaining an E-TFC for reliable SI transmission and carrying out an out loop power update in accordance with an example embodiment of the invention.

FIG. 4 illustrates an example message flow diagram 400 for obtaining an E_TFC for reliable SI transmission and carrying out an out loop power update in accordance with an example embodiment of the invention. In the example network scenario, three network entities, a RNC, a NodeB as an active macro cell, and a UE, are involved in the example message flow diagram 400 and the network entities are functionally similar to the RNC 130, the active macro cell 110 and the UE 102 of FIG. 1 respectively.

In one example embodiment of the present invention, the eNodeB at step 402 may send an absolute grant (AG) or a relative grant (RG) over an E-AGCH or E-RGCH channel to the UE. This may happen on a number of occasions, such as a call initiation, the UE booting up, a handover completion, etc. Then the eNodeB at step 404 may determine an ESPB value and sends the ESPB value over a HS-SCCH to the UE either on a periodic basis according to an agreed protocol or on occurrence of certain events. The UE at step 405 may select an E_TFC based on the received ESPB value for the SI multiplexed data transmission. Then the UE at step 406 may multiplex the SI with a MAC-e/i data frame and then send the SI multiplexed data frame to the eNodeB. The eNodeB at step 407 may update the ESPB value based on errors in the received SI multiplexed subframes. The eNodeB may adjust the ESPB value up or down or keep it same, in proportion to an increase, a decrease and no change of the errors in the received SI multiplexed data frames. Then the eNodeB at step 410 may set an SI_indication bit in the header of each data frames to indicate whether it is an SI multiplexed data frame and then send the data frame to the RNC. The RNC at step 411 may decide an outer loop power control action depending on whether the SI_indication bit is set in a received data frame. If the SI_indication bit is set, the RNC may not update an SIR-target to avoid a double adjustment because the UE already factored in the ESPB value in selecting the E-TFC. Otherwise the RNC updates the SIR. Then the RNC at step 412 may send the SIR target to the eNodeB. The message flow diagram 400 is for illustration only and the steps of the message flow may be combined, divided, or executed in a different order than illustrated, without departing from the scope of the invention of this example embodiment.

Figure 5:
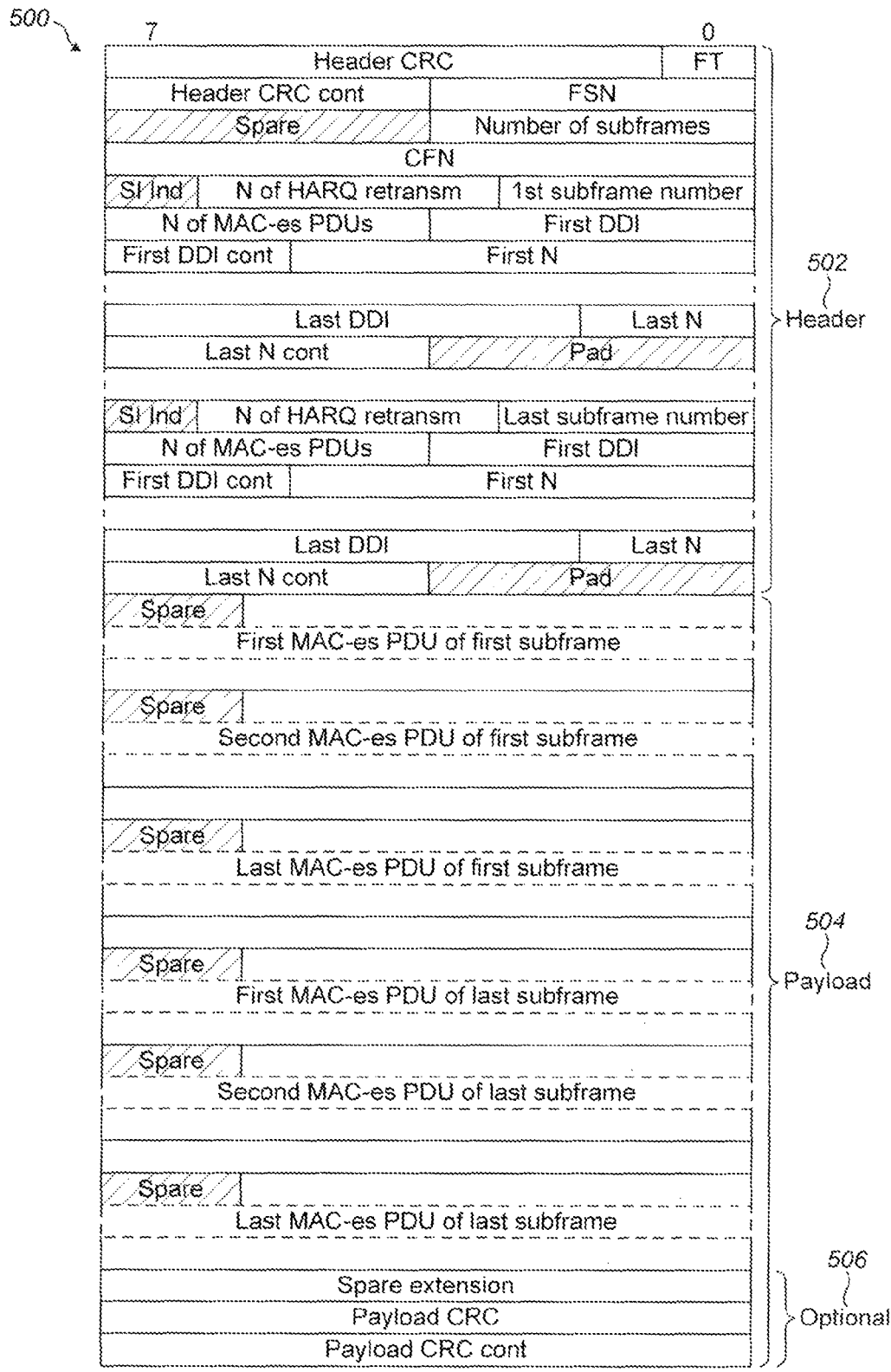
FIG. 5 illustrates an example data frame structure including an SI indicator in accordance with an example embodiment of the invention.

FIG. 5 illustrates an example frame structure 500 with an SI_indicator in accordance with an example embodiment of the invention. Specifically, the frame structure 500 illustrates an example E-DCH uplink (UL) data frame type 1 structure and includes a header 502, a payload 504 and an optional part 506. The header 502 has a number of spare bits next to the No. of HARQ retransmission field, and in one example embodiment, one of the spare bits is used as an SI_Indication bit for an active macro cell 110 to indicate to the RNC 130 that this is an SI multiplexed data frame.

FIG. 6 illustrates an example wireless apparatus in accordance with an example embodiment of the invention. In FIG. 6, the wireless apparatus 600 may include a processor 615, a memory 614 coupled to the processor 615, and a suitable transceiver 613 (having a transmitter (TX) and a receiver (RX)) coupled to the processor 615, coupled to an antenna unit 618 and a power management unit 616. The memory 614 may store programs such as a resource scheduling module 612. The wireless apparatus 600 may be at least part of a generic 4$^{th}$ generation handset, or an LTE compatible mobile station.

The processor 615 or some other form of generic central processing unit (CPU) or special-purpose processor such as digital signal processor (DSP), may operate to control the various components of the wireless apparatus 600 in accordance with embedded software or firmware stored in memory 614 or stored in memory contained within the processor 615 itself. In addition to the embedded software or firmware, the processor 615 may execute other applications or application modules stored in the memory 614 or made available via wireless network communications. The application software may comprise a compiled set of machine-readable instructions that configures the processor 615 to provide the desired functionality, or the application software may be high-level software instructions to be processed by an interpreter or compiler to indirectly configure the processor 615.

In an example embodiment, the resource scheduling module 612 may be configured to receive a request with a priority for radio frequency (RF) resource for a traffic load from one of a plurality of radio stacks. The resource scheduling module 12 is also configured to decide the priority for the received request according to one of a user configurable priority scheme, a default priority scheme and a priority scheme. The resource scheduling module 612 is capable of communicating with an active cell or base station via standards protocol such as RRC protocol.

In one example embodiment, the transceiver 613 is for bidirectional wireless communications with another wireless device. The transceiver 613 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 613, portions of the antenna unit 618, and an analog baseband processing unit may be combined in one or more processing units and/or application specific integrated circuits (ASICs). Parts of the transceiver may be implemented in a field-programmable gate array (FPGA) or reprogrammable software-defined radio.

As shown in FIG. 6, the wireless apparatus 600 may further include a power management unit 616, which may receive an ESPB value from an active macro cell in a HetNet scenario. The power management unit 616 in collaboration with the resource management module 612 and other modules, may determine an enhanced-transport format combination (E-TFC) based on the received ESPB value. More specifically, if an MAC-e/i data PDU to be transmitted is multiplexed with the SI, the E-TFC is selected based on an indicated power of a serving grant minus the received ESPB value and a set of E-TFC offset values. Otherwise, E-TFC is selected according to the indicated power of the serving grant and the set of E-TFC offset values. Then the apparatus 600 may transmit data to the active macro cell 110 using a transmission power indicated in the serving grant. This has an effect of selecting a reliable (low MCS) E-TFCI while keeping the high transmission power as indicated by the serving Grant.

In an example embodiment, the antenna unit 618 may be provided to convert between wireless signals and electrical signals, enabling the wireless apparatus 600 to send and receive information from a cellular network or some other available wireless communications network or from a peer wireless device. In an embodiment, the antenna unit 618 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 618 may include antenna tuning and/or impedance matching components, RF power amplifiers, and/or low noise amplifiers.

In general, the various exemplary embodiments of the wireless apparatus 600 may include, but are not limited to, part of a mobile station, an access point or a wireless device such as a portable computer having wireless communication capabilities, Internet appliances permitting wireless Internet access and browsing, as well as portable units or terminals that incorporate combinations of such functions. In one embodiment, the wireless apparatus 600 may be implemented in the network node 102 of FIG. 1.

Without in any way limiting the scope, interpretation, or application of the claims appearing below, a technical effect of one or more of the example embodiments disclosed herein is a reliable SI reception by a base station in case of SHO in a Hetnet scenario. Another technical effect of one or more of the example embodiments disclosed herein is improved efficiency of the data and SI transmission.

Embodiments of the present invention may be implemented in software, hardware, application logic or a combination of software, hardware and application logic. The software, application logic and/or hardware may reside on a mobile station, an access point, a user equipment or similar network device. If desired, part of the software, application logic and/or hardware may reside on access point, and part of the software, application logic and/or hardware may reside on a network element such as a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a mobile device, with one example of a mobile device described and depicted in FIG. 6. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed:

1. A method for a user equipment (UE) to obtain an enhanced-transport format combination (E-TFC) for transmitting a scheduling information (SI) in a soft handoff (SHO) to a serving enhanced Data Channel (E-DCH) cell in a heterogeneous Network (HetNet), the method comprising
receiving an E-TFC selection power backoff (ESPB) value from an active macro cell, the active macro cell being the serving E-DCH cell;
determining the E-TFC based on an indicated power of a serving grant minus the received ESPB value and a set of E-TFC power offset values received from the active macro cell, if an MAC-e/i data PDU to be transmitted is multiplexed with the SI;
otherwise, determining the E-TFC based on the indicated power of the serving grant and the set of E-TFC power offset values; and
transmitting the MAC-e/i PDU to the active macro cell using the indicated power of the serving grant and an enhanced dedicated channel selected based on the determined E-TFC.

2. The method of claim 1, further comprising updating a maximum allowed power for the determined E-TFC based on the serving grant and the received ESPB value before the determining of the E-TFC, wherein the serving grant is based at least on one of an absolute grant, a relative grant and a UE status.

3. An apparatus for use in a user equipment (UE) to obtain an enhanced-transport format combination (E-TFC) for transmitting a scheduling information (SI) in a soft handoff (SHO) to a serving enhanced Data Channel (E-DCH) cell in a heterogeneous Network (HetNet), the apparatus comprising: at least one processor; and at least one memory including computer program code; the at least one memory and the computer program code being configured to, with the at least one processor, cause the apparatus at least to:

receive an E-TFC selection power backoff (ESPB) value from an active macro cell, the active macro cell being the serving E-DCH cell;

determine the E-TFC based on an indicated power of a serving grant minus the received ESPB value and a set of E-TFC power offset values received from the active macro cell, if an MAC-e/i data PDU to be transmitted is multiplexed with the SI;

otherwise, determine the E-TFC based on the indicated power of the serving grant and the set of E-TFC power offset values; and transmit the MAC-e/i data PDU to the active macro cell using the indicated power of the serving grant and an enhanced dedicated channel selected based on the determined E-TFC.

4. The apparatus of claim 3, the at least one memory and the computer program code being configured to, with the at least one processor, cause the apparatus to update a maximum allowed power for the determined E-TFC based on the serving grant and the received ESPB value before the determining of the E-TFC, wherein the serving grant is based at least on one of an absolute grant, a relative grant and a UE status.

5. The apparatus of claim 3, the at least one memory and the computer program code being configured to, with the at least one processor, cause the apparatus to determine the E-TFC by:

adjusting an enhanced Data Channel (E-DCH) power for each E-DCH autonomously according to a number of received acknowledgements and non-acknowledgements (ACK/NACK) in response to an SI multiplexed data transmission sent to the active macro cell; and causing the ESPB to be updated less frequently by the active macro cell and an associated radio network controller (RNC) as a result of adjusting the E-DCH power.

6. The apparatus of claim 3, the at least one memory and the computer program code being configured to, with the at least one processor, cause the apparatus to determine the E-TFC alternatively by:

receiving a second set of E-TFC power offset values from the active macro cell, each of the E-TFC power offset values setting a higher power for each E-TFC; and selecting the E-TFC with an E-TFC power offset value corresponding to a transmission power being closest to the indicated power of the serving grant.

7. The apparatus of claim 3, the at least one memory and the computer program code being configured to, with the at least one processor, cause the apparatus to perform at least one of receiving the ESPB value in the MAC-e/i PDU from the active macro cell in a RRC message; and receiving the ESPB value over an HS-SCCH channel from the active macro cell, according to an SI decoding performance wherein the active macro cell is responsible for updating the ESPB value based on a quality of SI multiplexed E-DCH data received at the active macro cell.

8. The apparatus of claim 3, the at least one memory and the computer program code being configured to, with the at least one processor, cause the apparatus to optimize the SI and data transmission using a time division multiplexed transmission for the data and SI.

9. The apparatus of claim 8, the at least one memory and the computer program code being configured to, with the at least one processor, cause the apparatus to optimize the SI and data transmission by refraining from multiplexing the SI with data upon receiving an indication from the active macro cell that the active macro cell is no longer capable of decoding packets correctly with a lowest E-TFCI or there is not a sufficient headroom for adjusting the serving grant for simultaneous transmissions.

10. The apparatus of claim 8, the at least one memory and the computer program code being configured to, with the at least one processor, cause the apparatus to optimize the SI and data transmission by one of:

transmitting the SI and data separately to the active macro cell using a time division multiple transmission as indicated in a control signaling message sent from the active macro cell or an associated RNC; and transmitting the SI and data separately to the active macro cell using the time division multiple transmission as determined by the UE itself when there is not a sufficient power to support a lowest E-TFCI after the ESPB value is applied in determining the E-TFC.

11. The apparatus of claim 3, the at least one memory and the computer program code being configured to, with the at least one processor, cause the apparatus to cause an update to an outer loop power control by:

causing an associated RNC not to update an SIR Target if the SI is multiplexed in a MAC-e/i data subframe; or causing the associated RNC to update the SIR Target based on an error of the MAC-e/i data subframe in an outer loop power control action, if the SI is not multiplexed in the MAC-e/i data subframe.

12. The apparatus of claim 3 wherein the UE is one of a LTE UE, a UMTS UE, and a UE with High Speed Packet Access (HSPA) capabilities.

13. A method for an active macro cell to obtain an enhanced-transport format combination indication (E-TFCI) for receiving a scheduling information (SI) in a soft handoff (SHO) in a heterogeneous Network (HetNet), the method comprising:

determining an ESPB value based on errors of SI multiplexed E-DCH data frames received from an UE;

signaling the ESPB to the UE;

setting an SI indication bit in each of received MAC-e/i data frames and forwarding the data frame to an associated RNC;

causing an outer loop power control (OLPC) adjustment at the associated RNC; and optimizing SI and data transmissions.

14. The method of claim 13, further comprising allocating a serving grant to the UE, wherein the serving grant is based at least on one of an absolute grant, a relative grant and a UE status.

15. The method of claim 13, further comprising:

transmitting a set of E-TFC power offset values to the UE each of the E-TFC power offset values setting a higher power for each E-TFC.

16. The method of claim 13, further comprising:

transmitting the ESPB value in the MAC-e/i PDU to the UE in a RRC message;

transmitting the ESPB value over an HS-SCCH channel to the UE; and updating the ESPB value based on a quality of received SI multiplexed E-DCH data.

17. The method of claim 13, transmitting an indication to the UE that the active macro cell is no longer capable of decoding packets correctly with a lowest E-TFCI or there is not a sufficient headroom for adjusting a serving grant for simultaneous transmissions.

18. The method of claim 13, further comprising:

transmitting the ESPB over an HS-SCCH.

19. The method of claim 18, further comprising:
transmitting an updated ESPB over the HS-SCCH after the ESPB has been updated by the active macro cell.

20. The method of claim 19, further comprising:
transmitting to a radio network controller, a data frame with SI_IND flag set, after transmitting the ESPB over the HS-SCCH.

\* \* \* \* \*